A. MADDEN.
Halter to Prevent Horses from Cribbing.

No. 227,026. Patented April 27, 1880.

WITNESSES:
Francis McArdle
C. Sedgwick

INVENTOR:
A. Madden
BY Munn & Co
ATTORNEYS.

UNITED STATES PATENT OFFICE.

AMBROSE MADDEN, OF ASBURY PARK, NEW JERSEY.

HALTER TO PREVENT HORSES FROM CRIBBING.

SPECIFICATION forming part of Letters Patent No. 227,026, dated April 27, 1880.

Application filed February 19, 1880.

*To all whom it may concern:*

Be it known that I, AMBROSE MADDEN, of Asbury Park, in the county of Monmouth and State of New Jersey, have invented a new and useful Improvement in Halters to Prevent Horses from Cribbing, of which the following is a specification.

My invention relates to an attachment for use with halters for preventing horses from cribbing and to cure them of that pernicious habit; and the invention consists in a combination of rigid arms and straps hung upon the halter and carrying a spiked plate, which is retained beneath the animal's under lip in such manner that the motions of the horse in the act of cribbing cause the spikes to prick.

The construction will be described in detail with reference to the accompanying drawings, which form part of this specification, and wherein—

Figure 1:
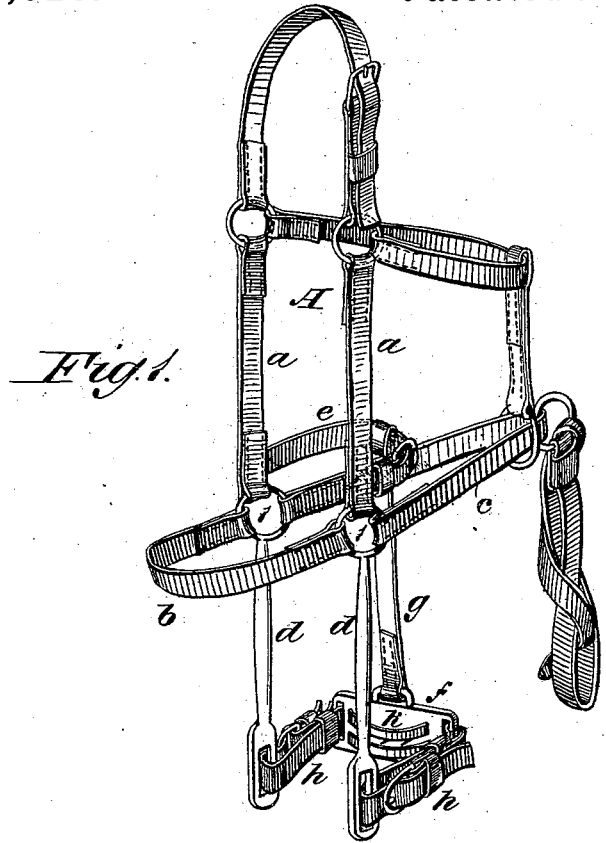
Figure 2:
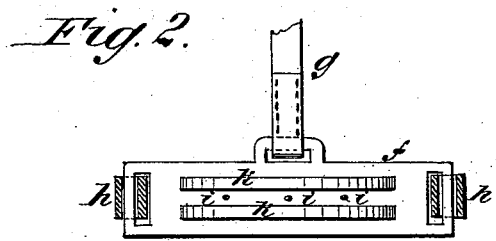
Figure 3:
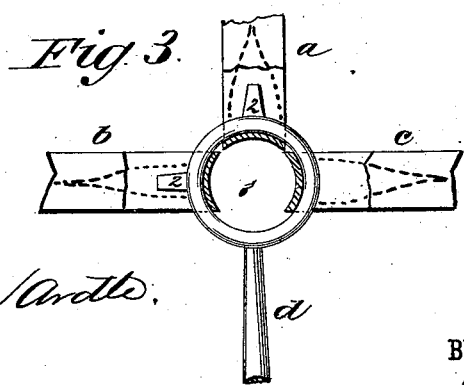

Figure 1 is a perspective view of a halter with my attachment applied thereto. Fig. 2 is a face view of the spiked plate. Fig. 3 is a detail view in larger size, showing the manner in which the rigid arms are connected with the halter.

Similar letters of reference indicate corresponding parts.

A is a halter of usual construction, of which *a a* are the side or cheek straps, *b* the front or nose strap, and *c* the throat-strap.

My attachment consists of the metal bars *d d*, which are formed in one piece with the ring 1, that connects the straps *a b c* of the halter, the under-jaw strap *e*, that is connected with side straps, *a*, the plate *f*, that is suspended from strap *e* by a billet, *g*, and the straps *h h*, that connect the plate *f* to the lower end of bars *d*.

On the rings 1, on the upper ends of bars *d*, are formed spurs or projections 2, which project into the folds of the straps *a b*, (see Fig. 3,) and by the sewing are held firmly, so that the ring cannot turn, and the bars are held rigidly in place at the sides of the horse's jaw.

The lower ends of bars *d* are slotted, as shown, to receive the straps *h*, which latter are fitted with buckles to allow of adjustment in length.

The strap *e* will pass closely around the under jaw, and with the billet *g* will sustain the plate *f* and prevent the same from being drawn or falling down.

The plate *f* is fitted on its front side with a number of teeth or spikes, *i*, and with bent spring-plates *k*, that are secured at opposite ends, and curve outward beyond the ends of the spikes, so that the spikes will not enter the animal unless considerable pressure is applied to the springs.

In use, when the halter is applied to the horse the attachment does not prevent perfect freedom of movement to the animal's head and mouth; but when he seizes the manger and drops his lower jaw, as in the habit of cribbing, the pins *i* will prick the under jaw or lip. This has the effect to prevent the horse from cribbing and break up the habit.

It is to be understood that horses practice this habit when tied in the stall, and it is therefore usually only necessary to apply the attachment to the halter.

Having thus described my invention, I claim as new and desire to secure by Letters Patent—

1. The cribbing attachment for halters, consisting of the rigid arms *d*, spiked plate *f*, and adjustable straps *h h*, connected with the plate *f* and bars *d*, combined with the halter, substantially as and for the purposes set forth.

2. In cribbing attachments for halters, the plate *f*, provided with the spikes *i* and springs *k*, suspended from the halter, and connected to the rigid side bars, *d*, substantially as described and shown.

3. In cribbing attachments for halters, the bars *d*, provided with the rings 1 and spurs 2, for connection with the halter-straps, as described, and connected at their lower ends with the spiked plate *f*, substantially as described and shown.

AMBROSE MADDEN.

Witnesses:
L. E. WATSON,
R. TENBROECK STOUT.